United States Patent
Haas et al.

(10) Patent No.: US 8,240,797 B2
(45) Date of Patent: Aug. 14, 2012

(54) SYSTEM AND METHOD FOR PROVIDING GRAPHIC SECURITY TO A DOCUMENT AT THE TIME OF PRINTING

(75) Inventors: Bertrand Haas, Somerville, MA (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 322 days.

(21) Appl. No.: 12/641,541

(22) Filed: Dec. 18, 2009

(65) Prior Publication Data

US 2011/0148958 A1    Jun. 23, 2011

(51) Int. Cl.
*B41J 29/38*    (2006.01)
(52) U.S. Cl. .............................. 347/9; 347/14
(58) Field of Classification Search ............... 347/9, 14, 347/19
See application file for complete search history.

(56) References Cited

U.S. PATENT DOCUMENTS

| | | | |
|---|---|---|---|
| 5,974,548 | A | 10/1999 | Adams |
| 7,369,679 | B2 | 5/2008 | Ameline et al. |
| 7,512,280 | B2 | 3/2009 | Alasia et al. |
| 2006/0020802 | A1* | 1/2006 | Haas et al. ............... 713/176 |
| 2006/0133877 | A1 | 6/2006 | Lynggaard |
| 2006/0197803 | A1 | 9/2006 | Steiner |

FOREIGN PATENT DOCUMENTS

| | | |
|---|---|---|
| DE | 102006011071 A1 | 9/2007 |
| JP | 2000134460 A | 12/2000 |

OTHER PUBLICATIONS

The European Search Report for European Patent Application No. 10 194 302.5.

* cited by examiner

*Primary Examiner* — An Do
(74) *Attorney, Agent, or Firm* — George M. Macdonald; Charles R. Malandra, Jr.; Steven J. Shapiro

(57) ABSTRACT

A method of printing an image having a graphic security element included therein includes receiving main image data representing a main image, receiving graphic security element data representing a graphic security element to be included in the main image, receiving a request to print the main image, responsive to receiving the request to print the main image, determining particular pixels of the main image data that are to be shifted based on the graphic security element data, and causing a plurality of ink deposits to be deposited on the print medium based on the main image data including causing the position of each of the ink deposits on the print medium that is determined to correspond to shifted pixels to be shifted relative to a normal position that would normally result from the main image data. Also, system that implements the method is provided.

14 Claims, 3 Drawing Sheets

SYSTEM AND METHOD FOR PROVIDING GRAPHIC SECURITY TO A DOCUMENT AT THE TIME OF PRINTING

FIELD OF THE INVENTION

The present application relates to graphic security features for printed documents, and, in particular, in certain embodiments, to a system and method for providing graphic security to printed documents at the time of printing.

BACKGROUND

Many valuable documents, such as, without limitation, bank notes, checks, identification documents, tickets, and postal indicia are produced and distributed/used in printed form. Unfortunately, various technologies are now readily available for making high-quality copies of such documents. As a result, falsification and counterfeiting of valuable documents is a serious concern.

One approach that has been developed to protect against falsification and counterfeiting of valuable documents has been to use a graphic security feature that is applied to or printed with the document to be protected. These features, often in the form of an image, are generally not viewable without the assistance of a specialized device that renders them visible. For example, one known graphic security method described in, for example, U.S. Pat. No. 7,512,280, involves adding a watermark image to material that is to be printed in the form of a slight shift in the position (from their normal position) of certain of the pixels (e.g., dots) of the material to be printed. The shifted pixels, which represent the watermark image, can only be rendered visible by applying a device to the document such as a transparent sheet made of many small lenses or a Moiré mask. Typical graphic security features that are specific for printed documents and that do not depend on special materials (special ink or paper), such as the watermarks and copy detection patterns (CDPs) just described, actually reside in the digital document to be printed (in other words, it is stored in the digital data that represents the document that is ultimately printed). As a result, it is possible to duplicate the digital document with its graphic security feature or to print it two or more times. This is a problem if the legitimate printed document is supposed to be unique. Particular applications where this problem is present include applications where documents, such as postal indicia, are printed at a customer site (using, for example, a digital postage meter).

Thus, there is at least a need for an improved system and method for protecting valuable digital documents from falsification and counterfeiting.

SUMMARY

In one embodiment, a method of printing an image having a graphic security element included therein is provided that includes receiving main image data representing a main image, receiving graphic security element data representing a graphic security element to be included in the main image, receiving a request to print the main image, responsive to receiving the request to print the main image, determining particular pixels of the main image data that are to be shifted based on the graphic security element data, and causing a plurality of ink deposits to be deposited on the print medium based on the main image data including causing the position of each of the ink deposits on the print medium that is determined to correspond to shifted pixels to be shifted relative to a normal position that would normally result from the main image data.

In one particular embodiment, each of the ink deposits is an ink drop ejected by an ink jet print head, and the step of causing the position of each of the ink deposits on the print medium that is determined to correspond to one of the shifted pixels to be shifted includes altering a travel path of each of those ink drops. More specifically, the method may include applying an electrostatic charge to each of the ink drops, wherein the altering of the travel path includes deflecting each of those ink drops using a plurality of charged deflecting plates.

Alternatively, each of the ink deposits is an ink drop ejected by an ink jet print head, and the step of causing the position of each of the ink deposits on the print medium that is determined to correspond to one of the shifted pixels includes delaying the ejection of each of those ink drops.

As a further alternative, each of the ink deposits may be produced in response to a laser pulse of a laser printer, and the step of causing the position of each of the ink deposits on the print medium that is determined to correspond to one of the shifted pixels includes delaying the laser pulse associated with each of those ink deposits.

In another embodiment, a system for printing an image having a graphic security element included therein includes a printer memory storing main image data representing a main image, a printer processor operatively coupled to the printer memory, and a graphic security processor storing graphic security element data representing a graphic security element to be included in the main image. Responsive to receiving a request to print the main image, the main image data is sent to the printer processor and the graphic security processor. The printer processor is programmed to, responsive to receiving the main image data, cause a plurality of ink deposits to be deposited on the print medium based on the main image data. The graphic security processor is programmed to, responsive to receiving the main image data, determine particular pixels of the plurality of pixels of the main image data that are to be shifted based on the graphic security element data and cause a position of each of the ink deposits on the print medium that is determined to correspond to one of the shifted pixels to be shifted relative to a normal position that would normally result from the main image data.

In one particular embodiment, the system further includes an ink jet print head operatively coupled to the printer processor, wherein each of the ink deposits is an ink drop ejected by the ink jet print head, wherein the graphic security processor is programmed to cause the position of each of the ink deposits on the print medium that is determined to correspond to one of the shifted pixels to be shifted by altering a travel path of each of the ink drops determined to correspond to one of the particular pixels after being ejected from the ink jet print head.

In another particular embodiment, the system further includes a deflector assembly structured to: (i) apply an electrostatic charge to each of the ink drops, and (ii) under control of the graphic security processor, alter the travel path of each of the ink drops determined to correspond to one of the particular pixels after being ejected from the ink jet print head by deflecting each of the ink drops determined to correspond to one of the shifted pixels using a plurality of charged deflecting plates. The deflector assembly may include a plurality of charging plates for applying the charge to each of the ink drops, and a plurality of selectively energizable deflecting plates structured to, under control of the graphic security processor, deflect each of the ink drops determined to correspond to one of the shifted pixels using a plurality of charged deflecting plates.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE EXEMPLARY EMBODIMENTS

Figure 1:
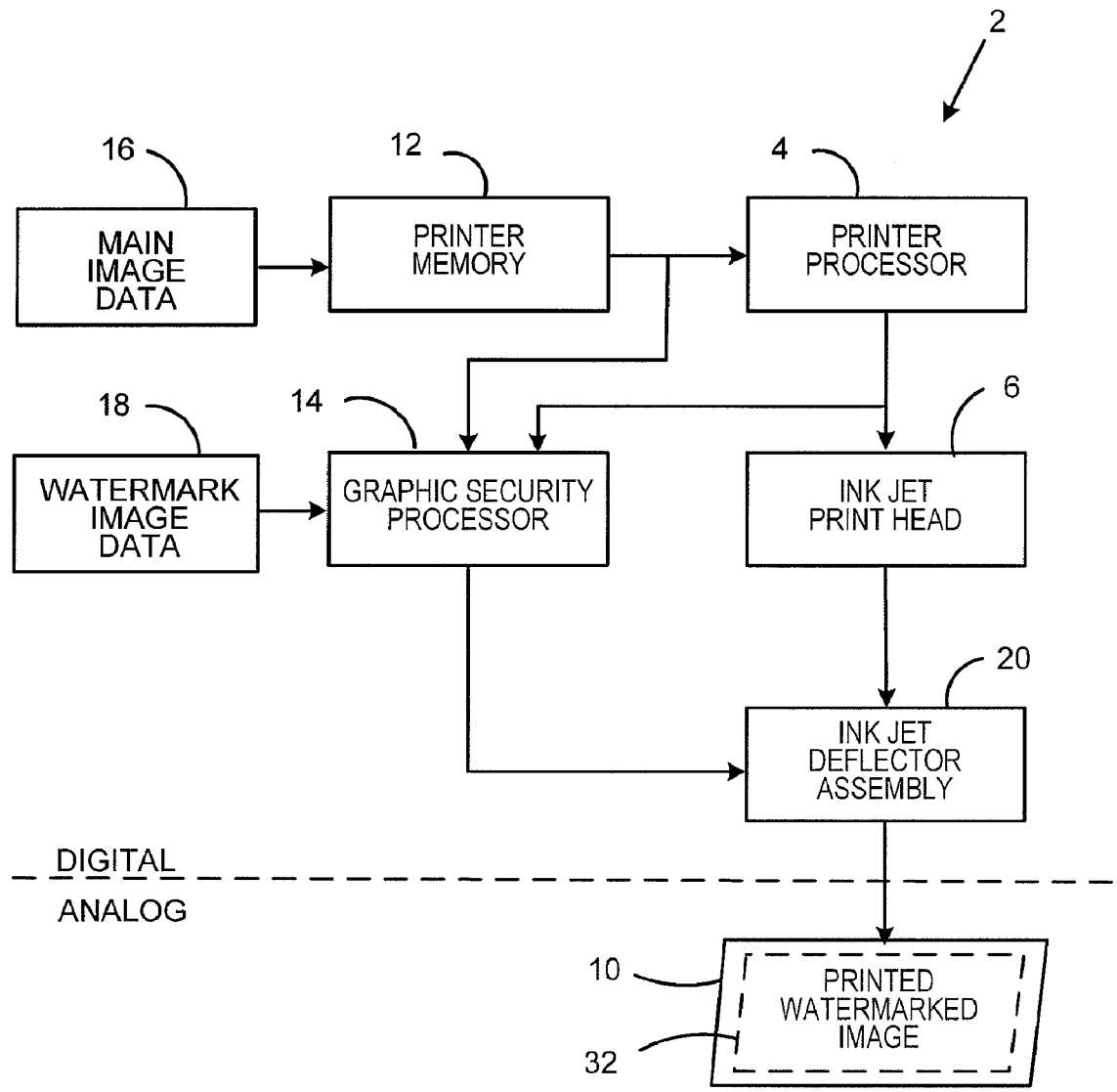
FIG. 1 is a schematic diagram of a system for providing graphic security to a printed document at the time of printing according to one particular embodiment of the invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a schematic diagram of a system 2 for providing graphic security to a printed document at the time of printing according to one particular embodiment of the invention. The system 2 includes a printer processor 4 which is operatively coupled to an ink jet print head 6. Processor 4 may be a microprocessor, a microcontroller, or another type of suitable processing device. The ink jet print head 6 may be any type of ink jet print head (e.g., thermal (bubble) ink jet or piezoelectric ink jet), and includes one or more arrays of one or more nozzles 8 (FIG. 2), each nozzle 8 having a corresponding ink ejection element. The printer processor 4 is structured and adapted to generate firing pulses for the ink jet print head 6. In response to the firing pulses, selected nozzles 8 are activated, thereby ejecting ink for deposit onto a print medium 10 such as a piece of paper. The system 2 also includes a printer memory 12 that is operatively coupled to the printer processor 4. The printer memory 12 comprises a suitable memory for storing data and routines to be executed by the printer processor 4 as will be described in greater detail herein.

System 2 further includes a graphic security processor 14 which is operatively coupled to both the printer processor 4 and the printer memory 12. The graphic security processor 14 may include a microprocessor, a microcontroller, or any other suitable processor, which is operatively coupled to a suitable memory for storing routines to be executed by the graphic security processor 14. Specifically, the memory, which may be separate from and/or internal to the microprocessor, microcontroller or other suitable processor, stores data and one or more routines for implementing the methods of operation described in greater detail elsewhere herein.

As shown in FIG. 1, the printer memory 12 is structured to receive and store digital main image data 16, which is data representative of a main image (sometimes called a cover image) to be printed by the system 2 onto the print medium 10. In addition, the graphic security processor 14 is structured to receive and store digital watermark image data 18, which is data representative of a graphic security feature to be included in the main image when it is printed by the system 2 onto the print medium 10.

Figure 2:
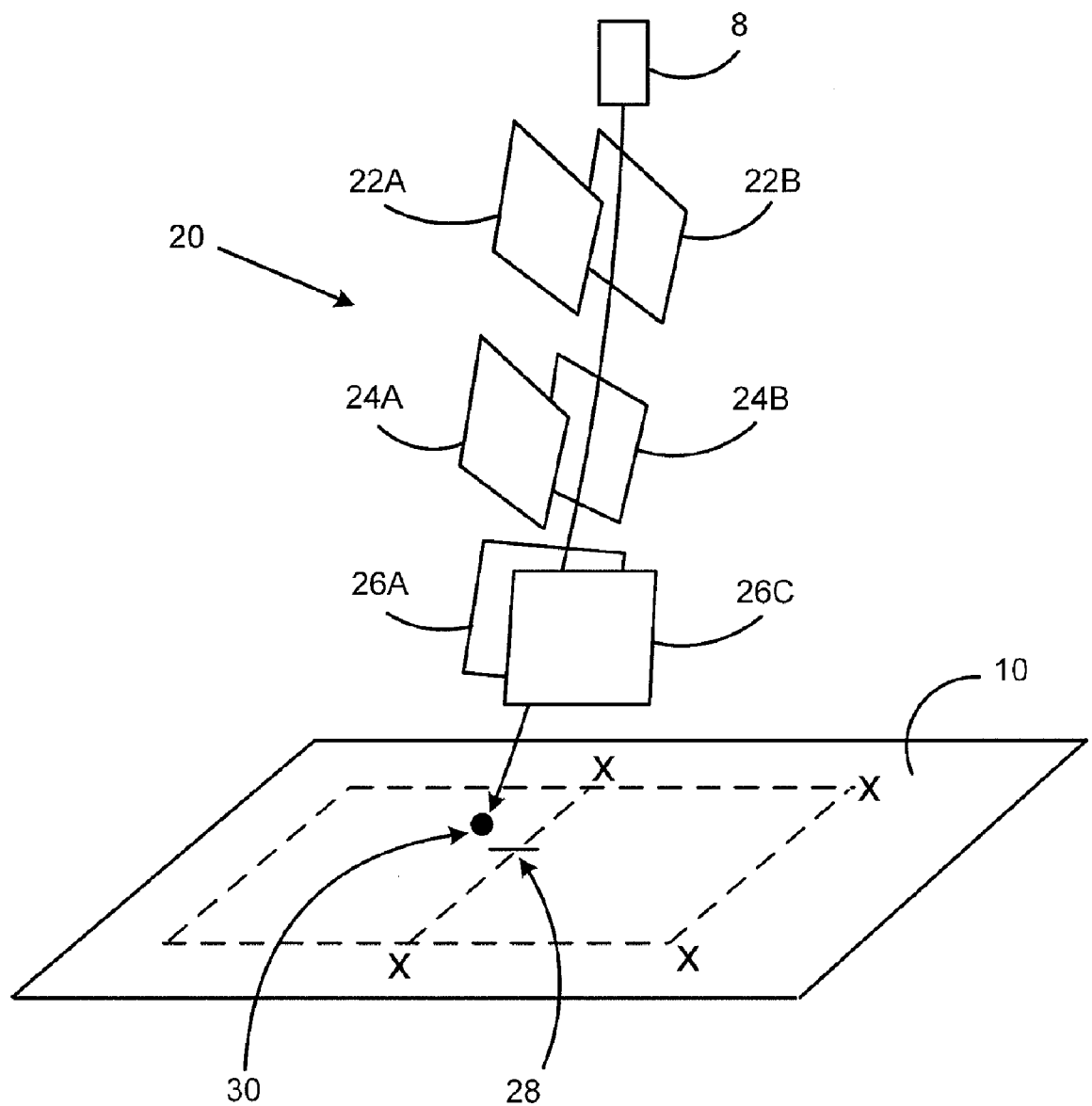
FIG. 2 is a schematic diagram of one particular embodiment of the ink jet deflector assembly of the system of FIG. 1.

The system 2 is further provided with an ink jet deflector assembly 20 which, as described in greater detail herein, is structured to selectively deflect particular drops of ink that are ejected by particular nozzles 8 of the ink jet print head 6. The ink jet deflector assembly 20 is operatively coupled to and under the control of the graphic security processor 14. FIG. 2 is a schematic diagram of one particular embodiment of the ink jet deflector assembly 20 operatively associated with a nozzle 8. The ink jet deflector assembly 20 includes a pair of charging plates (electrodes) 22A and 22B which are structured to apply an electrostatic charge to the drops of ink that are ejected by the nozzle 8 by creating an electrostatic field through which the drops of ink travel. The ink jet deflector assembly 20 also includes a first pair of deflection plates 24A and 24B that are operatively coupled to a voltage source (not shown), and a second pair of deflection plates 26A and 26B that are operatively coupled to a voltage source (not shown). The first pair of deflection plates 24A and 24B and the second pair of deflection plates 26A and 26B are configured and structured so that the first pair of deflection plates 24A and 24B is able to selectively deflect (i.e., alter or shift the path of travel) a charged drop of ink ejected by the nozzle 8 and passed through the pair of charging plates 22A and 22B in a first direction, and the second pair of deflection plates 26A and 26B is able to selectively deflect (i.e., alter or shift the path of travel) a charged drop of ink ejected by the nozzle 8 and passed through the pair of charging plates 22A and 22B in a second direction that is perpendicular to the first direction. Thus, the ink jet deflector assembly 20 as shown in FIG. 2 is able to selectively shift the path of an ink drop ejected by the nozzle 8 so that instead of landing on the print media 10 at a normal position 28, it will land on the print media 10 at a deflected position 30. Typically, in ink jet printing applications, printed dots are regularly spaced on the print medium in a square lattice pattern. In the present invention, the ink drops may be selectively shifted so that they land in a position between its normal position and the position of one of its eight closest neighbors (in band of normally empty space that exists between the dots).

For ease of illustration, the ink jet deflector assembly 20 has been shown as being operatively associated with only one nozzle 8 and includes only a single pair of charging plates 22A and 22B, a single pair of deflection plates 24A and 24B, and a single pair deflection plates 26A and 26B. It will be understood, however, that the present invention contemplates an ink jet deflector assembly 20 that is operatively associated with a plurality of nozzles 8 and that includes a plurality of pairs of charging plates 22A and 22B, deflection plates 24A and 24B and deflection plates 26A and 26B, all under the control of the graphic security processor 14 for selectively deflecting the ink drops ejected by the nozzles 8. In addition, in one alternative embodiment, a single pair of deflection plates may be employed such that the ink drops are able to be deflected in only one direction.

Figure 3:
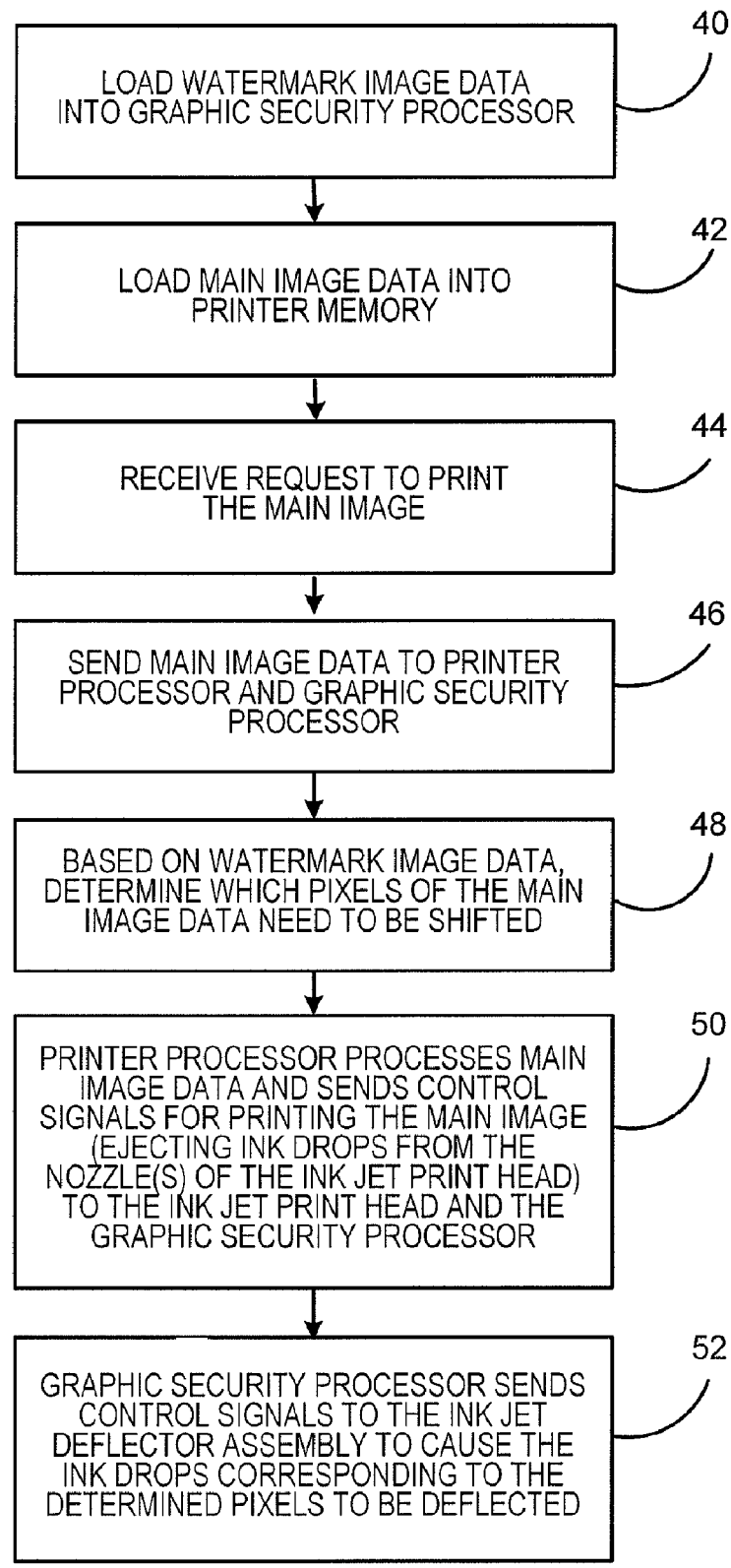
FIG. 3 is a flowchart illustrating a method for providing graphic security to printed documents at the time of printing according to one particular embodiment of the invention.

FIG. 3 is a flowchart illustrating a method for providing graphic security to printed documents at the time of printing according to one particular embodiment of the invention. The method begins at step 40, wherein the watermark image data 18 is loaded into the graphic security processor 14. The source of the digital watermark data may be an external channel similar to the main image data, or preferably, at least a part of the watermark data may be generated internally by the graphic security processor using, for example, a time, a random number, number of drops printed, or other counter or algorithm. Next, at step 42, the main image data 16 is loaded into the printer memory 12. At step 44, the system 2 receives a request (e.g., from a user) to print the main image that is represented by the main image data 16. At step 46, in response to receipt of the request, the main image data 16 is sent from the printer memory 12 to the printer processor 4 and the graphic security processor 14.

At step 48, the graphic security processor 14 determines which pixels of the main image data 16 need to be shifted and the amount and direction of that shift based on the watermark image data 18. Optionally, the graphic security processor 14 may scale and/or position the watermark image data 18 relative to the main image data 16 to, for example, ensure that the watermark represented by the watermark image data 18 is provided in an area of the main image represented by the main image data 16 that includes printed matter as blank parts of the main image cannot hold the watermark. Next, at step 50, the printer processor 4 processes the main image data 16 and generates and sends control signals for printing the main image (i.e., for causing ink drops to be ejected from the nozzle(s) of the ink jet print head 6 in a particular sequence and manner to form the main image) to the ink jet print head 6. Those same signals are also sent to the graphic security processor 14. At step 52, the graphic security processor 14 then sends control signals to the ink jet deflector assembly 10 to cause the particular ink drops being ejected that correspond to the particular pixels of the main image data 16 that were determined in step 48 to need shifting to actually be deflected by the ink jet deflector assembly 20. In the embodiment of the ink jet deflector assembly 20 shown in FIG. 2, for each of the ink drops that are to be deflected, either or both of the first pair of deflection plates 24A and 24B and the second pair of deflection plates 26A and 26B of will be energized (charged) to deflect the charged ink drop in the desired manner. As a result, a printed watermarked image 32 will be printed on the print medium 10 that includes the watermark represented by the watermark image data 18. To the naked eye, the printed watermarked image 32 will look like the main image represented by the main image data 16 (certain of the pixels thereof will have been slightly shifted) and the watermark will not be discernable. To view the watermark, a device such as a transparent sheet made of many small lenses or a Moiré mask will need to be applied to the print media 10 over the printed watermarked image 32.

In one particular embodiment that employs lenses or Moiré lines, the main image may be represented by $M(r)$, where $0<M(r)<1$ and the watermark image may be represented by $W(r)$, where in one embodiment, $0<W(r)<1$. Alternatively, W does not need to be positive, e.g., $-1<W(r)<1$. While the main image $M(r)$ is generally positive, the watermark image $W(r)$ can be positive or negative. In this implementation, the deflecting signal will be $S(r)=\alpha W(r)\sin(0.5\ k^*r \mod \pi)/(1-M(r))$, where r is the vector position in the space domain and k is the wavevector associated with the decoder device with magnitude $2\pi/d$, and where d is the spacing between lenses or Moiré lines. Alternatively, $S(r)=\alpha W(r)\sin(k^*r)/(1-M(r))$. Here, $\alpha$ is a scale factor that determines the magnitude of the deflections and the intensity of the watermark image. The denominator $(1-M(r))$ serves the purpose of compensating for the scarcity of dots in areas with high reflectance. If M is too close to 1, e.g., >0.8 in an open area, the watermark would not be applied in that area.

Thus, several illustrative embodiments of the present application provide a system and method wherein the graphic security element to be included in a printed document is not stored with the main image of the printed document, but instead is stored separately and is only added at the time of printing. Thus, if the main image data is copied and printed, perhaps by a fraudster, it will not include the graphic security element.

In yet another embodiment, the size of the ink deposits is varied based on the graphic security element data. If smaller dots are printed in one position relative to the lens array, than the dots printed in a second position, then the effect would be similar to moving dots.

While the present invention has been described above in connection with ink jet printing technology and with a mechanism for deflecting ejected and electrostaticly charged ink drops, it should be understood that that is meant to be exemplary, and that the invention may be implemented in other particular embodiments. For example, and without limitation, the invention may be adapted for use in any digital printer, including a laser printer, by, for instance, replacing the mechanism for deflecting ejected ink drops with a delay channel, separate from the main image channel, that controls the delay of each droplet firing or laser pulse that corresponds to a pixel that is to be shifted to implement the watermark.

While several embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of printing an image having a graphic security element included therein, comprising:
   receiving main image data representing a main image using a printer processor, the main image data including a plurality of pixels;
   receiving graphic security element data representing a graphic security element to be included in the main image using a graphic security processor;
   receiving a request to print the main image;
   responsive to receiving the request to print the main image, determining particular pixels of the plurality of pixels of the main image data that are to be shifted based on the graphic security element data; and
   causing a plurality of ink deposits to be deposited on the print medium based on the main image data including causing a position of each of the ink deposits on the print medium that is determined to correspond to one of the particular pixels to be shifted by a deflector assembly controlled by the graphic security processor, relative to a normal position that would normally result from the main image data.

2. The method according to claim 1,
wherein each of the ink deposits is an ink drop ejected by an ink jet print head,
wherein the causing the position of each of the ink deposits on the print medium that is determined to correspond to one of the particular pixels to be shifted comprises altering a travel path, using the deflector assembly, of each of the ink drops determined to correspond to one of the particular pixels after being ejected from the ink jet print head.

3. The method according to claim 2, the method including applying an electrostatic charge to each of the ink drops, wherein
the altering the travel path of each of the ink drops determined to correspond to one of the particular pixels after being ejected from the ink jet print head comprises deflecting each of the ink drops determined to correspond to one of the particular pixels using a plurality of charged deflecting plates in the deflector assembly.

4. The method according to claim 1, wherein the graphic security element data comprises watermark image data representing a watermark image.

5. The method according to claim 1, further comprising
storing the main image data and the graphic security element data separately from one another.

6. The method according to claim 1, wherein the determining particular pixels of the plurality of pixels of the main image data that are to be shifted based on the graphic security element data includes scaling the graphic security element image data relative to the main image data.

7. The method according to claim 1, wherein the determining particular pixels of the plurality of pixels of the main image data that are to be shifted based on the graphic security element data includes positioning the graphic security element image data relative to the main image data.

8. A system for printing an image having a graphic security element included therein, comprising:
a printer memory storing main image data representing a main image, the main image data including a plurality of pixels;
a printer processor operatively coupled to the printer memory;
a graphic security processor storing graphic security element data representing a graphic security element to be included in the main image;
wherein responsive to receiving a request to print the main image the main image data is sent to the printer processor and the graphic security processor, wherein the printer processor is programmed to, responsive to receiving the main image data, cause a plurality of ink deposits to be deposited on the print medium based on the main image data, and wherein the graphic security processor is programmed to, responsive to receiving the main image data, determine particular pixels of the plurality of pixels of the main image data that are to be shifted based on the graphic security element data and cause a position of each of the ink deposits on the print medium that is determined to correspond to one of the particular pixels to be shifted by a deflector assembly controlled by the graphic security processor relative to a normal position that would normally result from the main image data.

9. The system according to claim 8, further comprising
an ink jet print head operatively coupled to the printer processor, wherein
each of the ink deposits is an ink drop ejected by the ink jet print head, wherein
the graphic security processor is programmed to cause the position of each of the ink deposits on the print medium that is determined to correspond to one of the particular pixels to be shifted by altering a travel path, using the deflector assembly, of each of the ink drops determined to correspond to one of the particular pixels after being ejected from the ink jet print head.

10. The system according to claim 9, further comprising
a deflector assembly structured to:
(i) apply an electrostatic charge to each of the ink drops, and
(ii) under control of the graphic security processor, alter the travel path of each of the ink drops determined to correspond to one of the particular pixels after being ejected from the ink jet print head by deflecting each of the ink drops determined to correspond to one of the particular pixels using a plurality of charged deflecting plates in the deflector assembly.

11. The system according to claim 10, wherein
the deflector assembly includes a plurality of charging plates for applying the charge to each of the ink drops, and a plurality of selectively energizable deflecting plates structured to, under control of the graphic security processor, deflect each of the ink drops determined to correspond to one of the particular pixels using a plurality of charged deflecting plates.

12. The system according to claim 8, wherein the graphic security element data comprises watermark image data representing a watermark image.

13. The system according to claim 8, wherein the graphic security processor is programmed to scale the graphic security element image data relative to the main image data.

14. The system according to claim 8, wherein the graphic security processor is programmed to position the graphic security element image data relative to the main image data.

* * * * *